(12) United States Patent
Honner

(10) Patent No.: US 8,856,090 B1
(45) Date of Patent: Oct. 7, 2014

(54) CLIENT-BASED COMPUTATION OF CHECKSUMS FOR PRODUCT INFORMATION

(75) Inventor: Nicholas Honner, Tokyo (JP)

(73) Assignee: Amazon Technologies, Inc., Reno, NV (US)

(*) Notice: Subject to any disclaimer, the term of this patent is extended or adjusted under 35 U.S.C. 154(b) by 210 days.

(21) Appl. No.: 13/424,996

(22) Filed: Mar. 20, 2012

(51) Int. Cl.
*G06F 17/30* (2006.01)

(52) U.S. Cl.
USPC .......................... 707/697; 707/698; 707/699

(58) Field of Classification Search
CPC .............. G06F 17/30067; G06F 17/30533; G06F 17/30563; G06F 17/30575; G06F 17/30; G06F 17/30286
USPC .................... 707/697, 698, 699, 710
See application file for complete search history.

(56) References Cited

U.S. PATENT DOCUMENTS

| | | | | |
|---|---|---|---|---|
| 6,269,382 | B1 * | 7/2001 | Cabrera et al. .......................... 1/1 |
| 7,895,515 | B1 * | 2/2011 | Oliver et al. ................... 715/237 |
| 8,136,033 | B1 * | 3/2012 | Bhargava et al. .............. 715/249 |
| 2003/0028451 | A1 * | 2/2003 | Ananian .......................... 705/27 |
| 2005/0075926 | A1 * | 4/2005 | Liu et al. .......................... 705/14 |
| 2005/0116033 | A1 * | 6/2005 | Moore .......................... 235/385 |
| 2006/0059424 | A1 * | 3/2006 | Petri et al. ...................... 715/530 |
| 2007/0124721 | A1 * | 5/2007 | Cowing et al. ................ 717/100 |
| 2008/0195507 | A1 * | 8/2008 | Ratnakar .......................... 705/27 |
| 2008/0313165 | A1 * | 12/2008 | Wu et al. ............................ 707/5 |
| 2009/0177800 | A1 | 7/2009 | Gidron et al. |
| 2010/0086192 | A1 * | 4/2010 | Grigsby et al. ............... 382/141 |
| 2010/0114957 | A1 * | 5/2010 | Benson et al. ................ 707/780 |
| 2010/0125497 | A1 * | 5/2010 | Arguello .................... 705/14.33 |
| 2011/0167004 | A1 * | 7/2011 | Zank .............................. 705/64 |
| 2012/0072409 | A1 * | 3/2012 | Perry et al. ..................... 707/710 |
| 2012/0191719 | A1 * | 7/2012 | Musgrove et al. ............ 707/740 |
| 2012/0203670 | A1 * | 8/2012 | Piersol ......................... 705/27.1 |
| 2012/0246022 | A1 * | 9/2012 | Johnson et al. .............. 705/26.5 |
| 2013/0124455 | A1 * | 5/2013 | Goodson et al. .............. 707/603 |

\* cited by examiner

*Primary Examiner* — Apu Mofiz
*Assistant Examiner* — Jared Bibbee
(74) *Attorney, Agent, or Firm* — Hope Baldauff, LLC

(57) ABSTRACT

A client device is configured to generate checksums for attributes of product records to be transmitted to a marketplace operator system that provides an e-commerce marketplace. On subsequent transmissions of the product records, the client device can utilize the checksums to determine if the attributes of the product records have been modified since a previous transmission. If the attributes have not been modified, the client device does not re-transmit the unchanged attributes to the e-commerce marketplace. The client device may also be configured to retrieve a checksum configuration file from the marketplace operator system that includes data defining the manner in which the client device should compute the checksums.

20 Claims, 11 Drawing Sheets

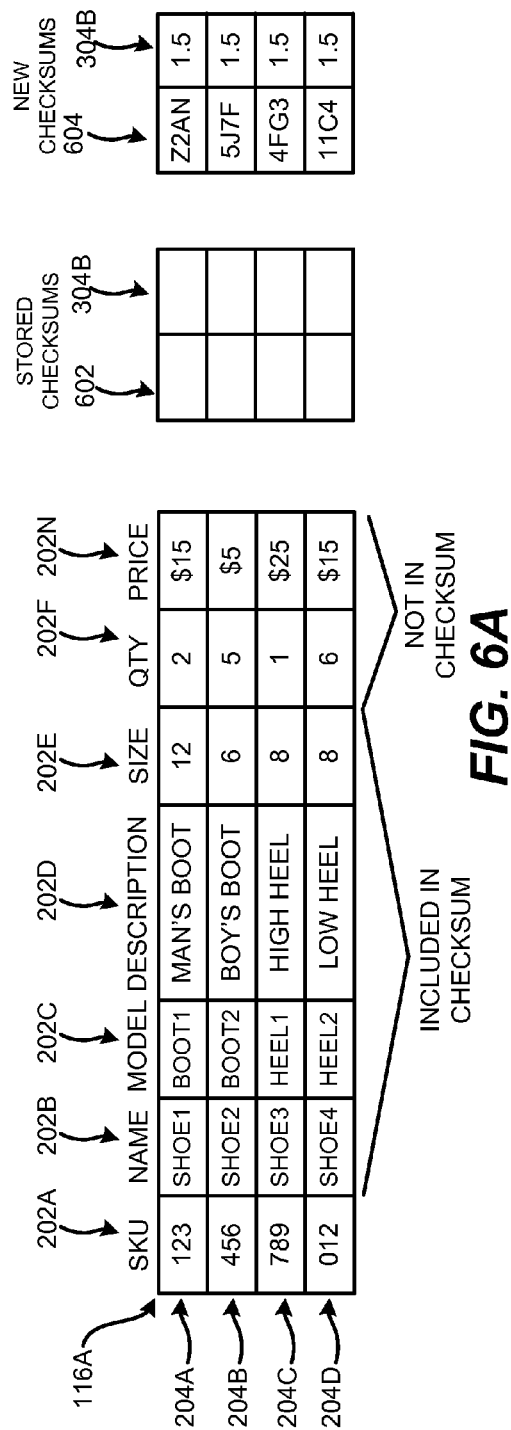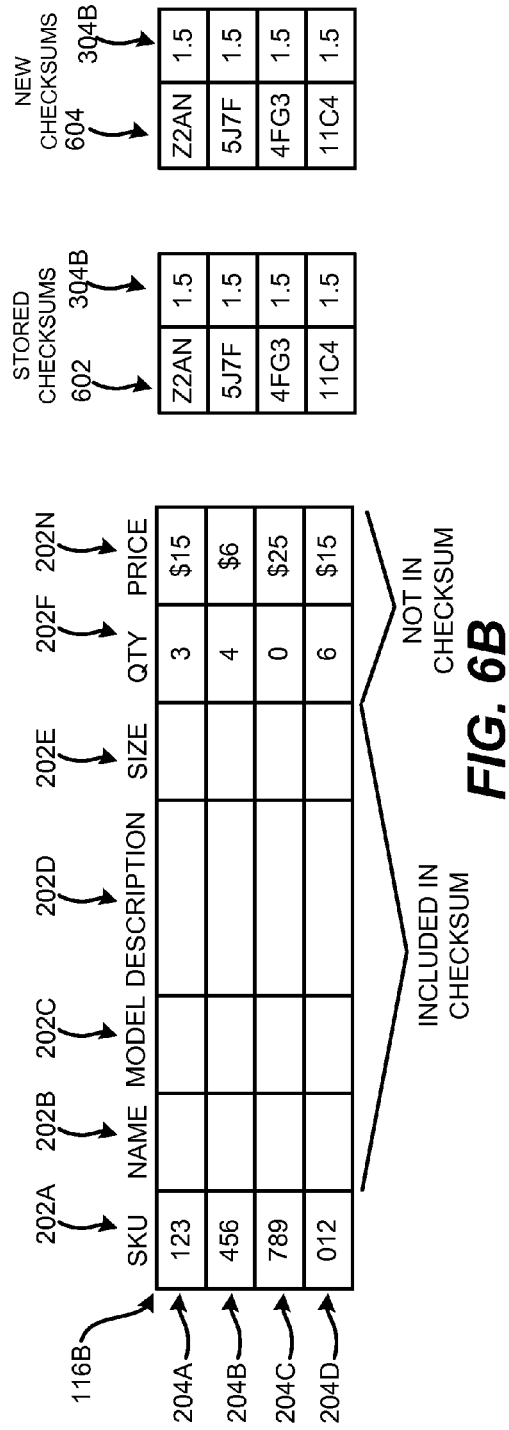

CLIENT-BASED COMPUTATION OF CHECKSUMS FOR PRODUCT INFORMATION

BACKGROUND

A marketplace operator may provide an online e-commerce marketplace for the purchase of a variety of products by customers. The products might include physical products that are shipped directly to customers and/or digital products that customers download from the e-commerce marketplace. The marketplace operator and/or third-party sellers may make products available for sale on the marketplace. The third-party sellers may provide product information for the products they have for sale to a marketplace operator system that provides the e-commerce marketplace. The product information is utilized to generate product listings for the products on the e-commerce marketplace.

The product information provided by sellers might include values for various attributes of a product, such as an identifier for a product, like a stock keeping unit ("SKU") number; a title or description of the product; technical specifications for the product; the purchase price; product availability, such as whether the product is "in stock"; shipping parameters and costs; the geographic region in which the product is available to customers; the locale of the seller's fulfillment center; and other types of product details. The product information may then be utilized to generate product listings in a product catalog. The product listings are made available through the online e-commerce marketplace for searching and browsing by customers wishing to purchase the corresponding products from the sellers.

On some e-commerce marketplaces, large sellers can offer hundreds of thousands or even millions of items for sale. As a result, these sellers must upload a large amount of product information to the e-commerce marketplace. The network bandwidth required to transmit and receive this amount of information can be very expensive for the sellers and the e-commerce marketplace, respectively. Additionally, processing very large amounts of product information for a large number of sellers can be computationally expensive for the e-commerce marketplace. It is with respect to these and other considerations that the disclosure made herein is presented.

BRIEF DESCRIPTION OF THE DRAWINGS

FIGS. 6A-6C are data structure diagrams showing several illustrative seller feeds and associated checksums during various stages of processing, according to embodiments disclosed herein;

DETAILED DESCRIPTION

Figure 1:
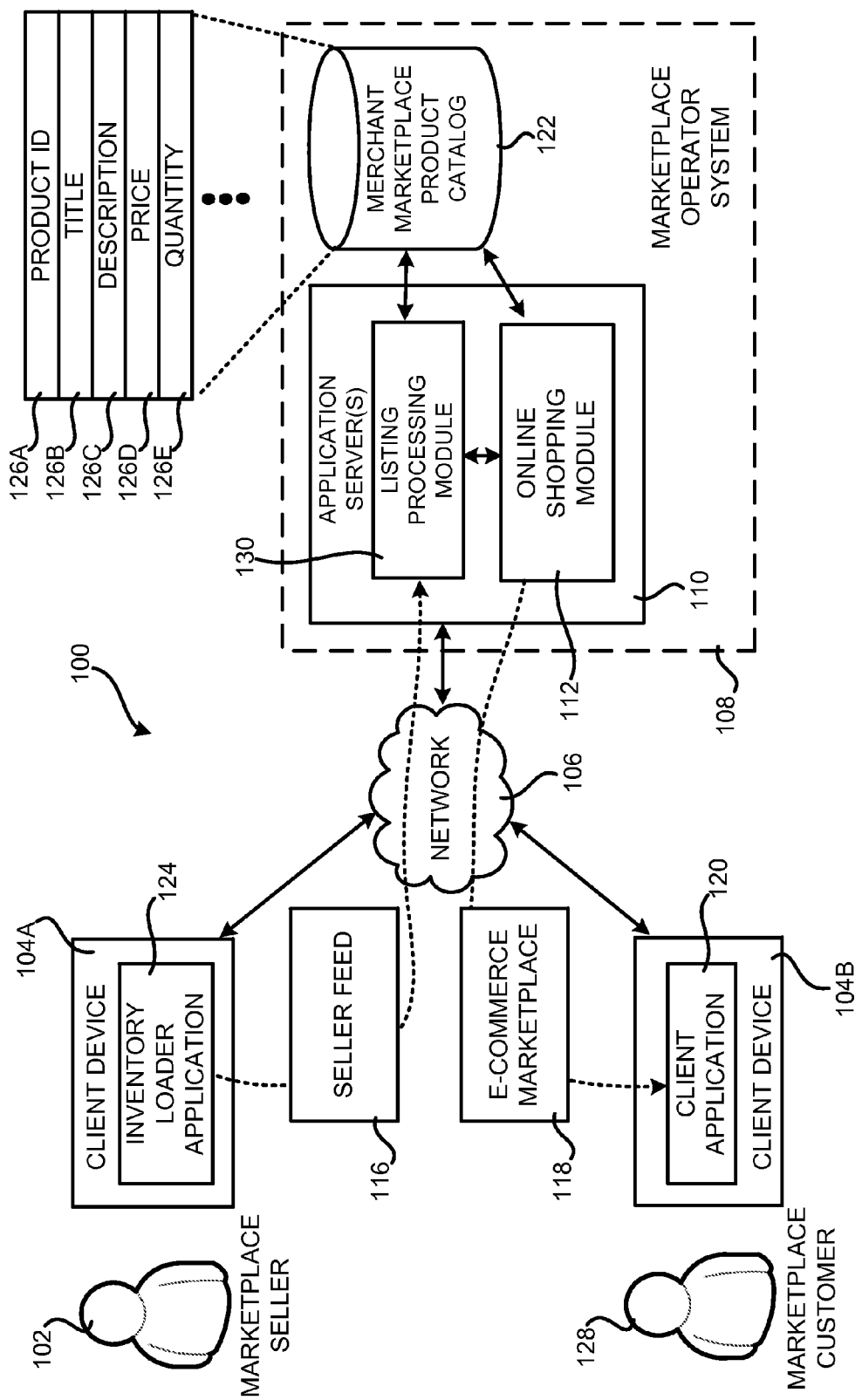
FIG. 1 is a system diagram showing an illustrative operating environment for the embodiments disclosed herein that includes a marketplace operator system for providing an online e-commerce marketplace.

The following detailed description is directed to technologies for client-based computation of checksums for product information. Through an implementation of the concepts and technologies disclosed herein, a client device can generate checksums for attributes of product records to be transmitted to an e-commerce marketplace. On subsequent transmissions of the product records, the client device can utilize the checksums to determine if the attributes of the product records have been modified since the previous transmission. If the attributes have not been modified, the client device does not re-transmit the attributes to the e-commerce marketplace, thereby saving the network bandwidth required to transmit the unchanged data, and also saving the server-side processing needed to process this data.

According to aspects presented herein, a marketplace operator system is disclosed that is configured to execute an online shopping module that provides an e-commerce marketplace, such as a World Wide Web ("Web") site, for online shopping. The online shopping module is also configured to maintain and utilize a product catalog that stores product listings for products available for purchase through the e-commerce marketplace. The e-commerce marketplace provides functionality for browsing and searching for products in the product catalog, for purchasing the products, and for performing other functions.

According to embodiments, the marketplace operator system is also configured to allow multiple sellers to sell products through the e-commerce marketplace. Sellers may provide product information to the marketplace operator system that is utilized to generate product listings for the products offered for sale by the sellers. As mentioned above, the product information provided by a seller might include data for various attributes of a product, such as an identifier for a product; a title or description of the product; technical specifications for the product; the purchase price; data regarding product availability; shipping parameters and costs; the geographic region in which the product is available to customers; the locale of the seller's fulfillment center; and other types of product details. The product information may then be utilized to satisfy search queries and to generate product listings for the products in the product catalog.

According to one embodiment, an inventory loader application is provided that executes on a client device and includes functionality for transmitting a seller feed to the marketplace operator system that provides the e-commerce marketplace. A seller feed contains product records storing product information for the products that a seller offers for sale through the e-commerce marketplace. A seller may initially upload their seller feed to the e-commerce marketplace to cause products to be listed for sale. A seller may then make changes to the seller feed, such as for instance, to change the description or available quantity of a product. The seller may then transmit the updated seller feed to the marketplace operator system that provides the e-commerce marketplace.

In order to minimize the amount of data transmitted in an updated seller feed, the inventory loader application is configured to generate checksums for attributes of product records in a seller feed in the various embodiments disclosed herein. In particular, the inventory loader application is configured to first retrieve a checksum configuration file from the marketplace operator system. The checksum configuration file contains data that describes to the inventory loader application how the checksums for the product records should be computed. In one embodiment, for instance, the checksum configuration file might specify a checksum algorithm and a version number of the checksum algorithm that should be utilized to generate the checksums. The checksum configuration file might also specify the attributes of each product record that are to be included in the checksum. For instance, the checksum configuration file might specify a subset of the attributes of each product record that do not change often for inclusion in the checksum. Other attributes of the product records that change frequently, such as an available quantity of a product, may not be included in the checksum.

Once the inventory loader application has retrieved the checksum configuration file from the marketplace operator system, the inventory loader application then processes each product record in the seller feed. In particular, for each record the inventory loader application first determines whether a checksum has been previously generated and stored for the product record. If a checksum has not been previously generated for the product record, the inventory loader application utilizes the version of the checksum algorithm specified by the checksum configuration file to generate a checksum for the attributes of the product record also specified by the checksum configuration file. The generated checksum and the checksum algorithm version number are then added to the product record.

If a checksum has been previously generated for the product record, the inventory loader application computes a new checksum for the product record. The inventory loader application then compares the newly computed checksum to the previously generated checksum. If the newly computed checksum is the same as the previously generated checksum, the inventory loader application removes the values of the attributes of the product record that are utilized to compute the checksum from the product record. In this way, unchanged data in the product record is removed from the product record and will not be re-transmitted to the marketplace operator system.

If the newly computed checksum is not the same as the previously generated checksum, the inventory loader application replaces the previously generated checksum with the newly computed checksum. The inventory loader application also adds the newly computed checksum and the algorithm version number utilized to compute the new checksum to the product record. In this way, a new checksum is generated for the attributes of the product record when the attributes have changed.

Once the inventory loader application has completed processing each of the product records in the seller feed in the manner described above, the inventory loader application transmits the processed seller feed to the marketplace operator system. The marketplace operator system may then process the product records in the seller feed in the manner described below.

If the marketplace operator system determines that the checksum for a product record is invalid or that a down level version of the checksum algorithm has been utilized, the marketplace operator system may transmit an error message to the inventory loader application instructing the inventory loader application to obtain an updated checksum configuration file and to re-compute the checksums for the product records in the seller feed. In response to receiving such a message, the inventory loader application deletes the previously generated checksum for each product record, retrieves an updated checksum configuration file, computes a new checksum for each record as specified by the updated checksum configuration file, adds the updated checksum to each product record along with the version number of the checksum algorithm utilized to generate the new checksum, and transmits the seller feed, including the updated product records, to the marketplace operator system.

In one implementation, a listing processing module executing on the marketplace operator system provides the checksum configuration file to the inventory loader application and also processes the seller feed. In order to process the seller feed, the listing processing module determines for each product record in the seller feed whether a checksum has been previously computed and stored at the marketplace operator system for the product record.

If a checksum has not been previously generated and stored for a product record, the listing processing module determines whether the checksum algorithm version number received with the product record corresponds to the most current checksum algorithm. If the checksum algorithm version number is not the most current one, the listing processing module then transmits an error message to the inventory loader application instructing the inventory loader to obtain an updated checksum configuration file and to re-compute the checksum for each product record in the seller feed.

If the checksum algorithm version number received with the product record corresponds to the most current checksum algorithm, the listing processing module computes and stores a checksum for the product record. The listing processing module then compares the computed checksum for the product record to the checksum received with the product record in the seller feed.

If the computed checksum does not match the received checksum, then the listing processing module transmits an error message to the inventory loader application instructing the inventory loader to obtain an updated checksum configuration file and to re-compute the checksum for each product record in the seller feed. If the computed checksum matches the received checksum, the listing processing module processes all of the attributes of the product record. For instance, all of the attributes of the product record may be utilized to update a product listing for the product in a product catalog of the marketplace operator system.

If a checksum has been previously generated and stored for the product record, the listing processing module determines whether the checksum received with the product record matches the checksum previously stored for the product record. If the checksum received with the product record matches the checksum previously stored for the product record, the listing processing module processes only those attributes of the product record that are not utilized to compute the checksum. For instance, the attributes of the product record not utilized to compute the checksum may be utilized to update a product listing for the product in a product catalog of the marketplace operator system. In this manner, the listing processing module does not expend computational resources processing data in a seller feed that has not changed since the previous receipt of the seller feed.

In other embodiments, the algorithm version number utilized to compute the checksum of the attributes of the product records may be specified only once in a product feed. In this way, the determination as to whether the checksum algorithm version number is correct for a given set of product records may be performed only once rather than on a per-record basis. In yet other embodiments, the inventory loader application may transmit a message to the listing processing module indicating its intent to transmit a seller feed with checksums computed with a particular checksum algorithm version number. If the checksum algorithm version number is acceptable to the listing processing module, it may respond to the message received from the inventory loader application with a message indicating approval to begin the transmission. If the checksum algorithm version number is not acceptable, the listing processing module may instruct the inventory loader application to re-compute the checksums with a different checksum algorithm version number and to retry the submission. In this way, the transmission of checksums generated with a down level checksum algorithm version may be avoided.

It should be appreciated that, in other embodiments, the client and server roles described herein may be reversed. For instance, in one embodiment, a server may be provided that performs the check summing and data removal operations described herein as being performed by the client. The server may then transmit records attributes to the client when the attributes have changed. Other configurations will be apparent to those skilled in the art. Additional aspects regarding the various concepts and technologies disclosed herein for client side generation of checksums for product information will be provided below with regard to FIGS. 1-9.

It should be appreciated that the embodiments disclosed herein might be utilized with any type of computer, computing system, device, Web site, application program, operating system, or other type of system or component. Accordingly, although the embodiments disclosed herein are primarily presented in the context of an inventory loader application executing on a client device and a listing processing module executing at a marketplace operator system that operate together to reduce the size of a seller feed, the disclosure presented herein is not limited to such an implementation. For example, the embodiments disclosed herein might be utilized to reduce the amount of other kinds of data that is transmitted between a client and a server, including data that makes a "round trip" between the client and the server.

It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several hardware and software components for client side computation of checksums for product information, according to embodiments provided herein. The environment 100 is merely illustrative and the embodiments disclosed herein might be utilized in other types of environments.

The environment 100 shown in FIG. 1 includes a marketplace operator system 108 that provides an e-commerce marketplace 118 through which customers may browse, search, and purchase products. In one embodiment, the marketplace operator system 108 includes a number of application servers 110 that provide various application services to sellers, such as the marketplace seller 102, and customers engaged in commerce through the e-commerce marketplace 118, such as the marketplace customer 128.

The application servers 110 may be implemented as standard server computers, database servers, Web servers, network appliances, desktop computers, other computing devices, and/or any combination thereof. The application servers 110 may execute a number of modules in order to provide the various services described herein. The modules may execute on a single application server 110 or in parallel across multiple application servers in the marketplace operator system 108. In addition, each module may consist of a number of subcomponents executing on different application servers 110 or other computing devices in the marketplace operator system 108. The modules may be implemented as software, hardware, or any combination of the two.

As shown in FIG. 1, a marketplace customer 128 may utilize a client device 104B to access the marketplace operator system 108 through a network 106. The network 106 may be a local-area network ("LAN"), a wide-area network ("WAN"), one or more wireless networks, the Internet, or any other networking topology known in the art that connects the client device 104B to the marketplace operator system 108. Although only a single marketplace customer 128 has been illustrated in FIG. 1, it should be appreciated that many customers may simultaneously utilize the e-commerce marketplace 118.

The marketplace customer 128 may be an individual or entity that desires to browse, search, purchase, or has purchased, one or more products from a marketplace operator. The client device 104B may be a personal computer ("PC"), desktop workstation, laptop computer, tablet computer, note-book computer, personal digital assistant ("PDA"), electronic-book reader, game console, set-top box, consumer electronics device, server computer, or any other type of computing device capable of connecting to the network 106 and communicating with the marketplace operator system 108. The marketplace customer 128 might also be referred to herein as a "user" or as a "visitor" to the e-commerce marketplace 118 provided by the marketplace operator system 108.

The marketplace customer 128 may use a client application 120 executing on the client device 104B to access and utilize the online shopping services provided by the application servers 110. In one embodiment the client application 120 is a Web browser application, such as the MOZILLA® FIREFOX® Web browser from MOZILLA FOUNDATION of Mountain View, Calif. The client application 120 exchanges data with the application servers 110 in the marketplace operator system 108 using the hypertext transfer protocol ("HTTP") or another appropriate protocol over the network 106. The client application 120 might also be a stand-alone client application configured for communicating with the application servers 110. The client application might also utilize any number of communication methods known in the art to communicate with the marketplace operator system 108 and/or the application servers 110 across the network 106, including remote procedure calls, SOAP-based Web services, remote file access, proprietary client-server architectures, and the like.

According to one embodiment, the application servers 110 execute an online shopping module 112. The online shopping module 112 provides the e-commerce marketplace 118, including functionality for allowing the marketplace customer 128 to browse, search, and purchase products available from the marketplace operator and from other sellers. For instance, the online shopping module 112 may retrieve a product listing for a particular product offered for sale by a marketplace operator or another seller from a product catalog 122, generate a Web page containing product information, and transmit the Web page over the network 106 to the client application 120 executing on the client device 104B for display to the marketplace customer 128.

The online shopping module 112 might utilize pre-stored or dynamically created resources to generate the e-commerce marketplace 118. For instance, Web pages, images, text files, program code for generating Web pages, metadata, scripts, executable code, and other types of data utilized to create and/or provide a Web page might be stored or dynamically generated. Other types of resources might also be stored or generated dynamically by the online shopping module 112 to provide the e-commerce marketplace 118. The online shopping module 112 might also maintain a customer profile data store (not shown) including information about customers of the marketplace operator system 108, such as their name, address and other contact information, payment information, preferences, and other data.

According to embodiments, the online shopping module 112 also provides functionality for allowing third-party sellers, such as the marketplace seller 102, to sell products on the e-commerce marketplace 118. Although only a single marketplace seller 102 is illustrated in FIG. 1, it should be appreciated that many such sellers might be permitted to sell products by way of the e-commerce marketplace 118.

In order to facilitate the listing of products for sale on the e-commerce marketplace 118 by marketplace sellers 102, the application servers 110 execute a listing processing module 130 in one embodiment. The listing processing module 130 receives a seller feed 116 from a marketplace seller 102 that contains product information describing the products the marketplace seller 102 wishes to make available for sale through the e-commerce marketplace 118.

The seller feed 116 may be a flat file containing tabular data, an extensible markup language ("XML") file, or any other data container in which product information can be encapsulated. The seller feed 116 may contain data for multiple product listings, each containing a number of fields identifying the product and describing various attributes of the product. The listing processing module 130 may receive the seller feed 116 from a client device 104A over the network 106. One illustrative seller feed 116 will be described below with regard to FIG. 2.

In one embodiment, the seller feed 116 is uploaded by an inventory loader application 124 executing on the client device 104A. The inventor loader application 124 may be configured to integrate with an inventory management system (not shown) operated by the marketplace seller 102. It should be appreciated that other mechanisms might be provided to enable a marketplace seller 102 to list products for sale on the e-commerce marketplace 118. For example, the online shopping module 112 might provide a Web-based interface through which the marketplace seller 102 can create product listings by specifying product information for products offered for sale by the marketplace seller 102. Other mechanisms might also be utilized.

Based upon the product information received in the seller feed 116, the listing processing module 130 creates product listings in the product catalog 122. As illustrated in FIG. 1, each of the product listings might include a number of attributes 126 for storing the product information specified for the corresponding product. In the example shown in FIG. 1, for instance, a product listing has been created in the product catalog 122 that includes an attribute 126A for storing a product identifier, an attribute 126B for storing a product title, an attribute 126C for storing a product description, an attribute 126D for storing a price for the product, and an attribute 126E for storing an available quantity of the product. It should be appreciated that the attributes 126 shown in FIG. 1 are merely illustrative and that many more attributes might be specified in a product listing. It should also be appreciated that the attributes 126 for each product listing might vary. For example, the products in each product category might have different attributes 126.

As mentioned briefly above, a seller 102 may initially upload their seller feed 116 to the marketplace operator system 108 to cause products to be listed for sale on the e-commerce marketplace 118. The seller 102 may then make changes to the seller feed 116, such as for instance, to change the description or available quantity of a product. The seller 102 may then transmit the updated seller feed 116 to the marketplace operator system 108.

In order to minimize the amount of data transmitted in an updated seller feed 116, the inventory loader application 124 and the listing processing module 130 are configured to generate and process checksums for attributes of product records in a seller feed 116 in the various embodiments disclosed herein. Additional details regarding the operation of the inventory loader application 124 executing on the client device 104A and the listing processing module 130 executing on the application servers 110 will be provided below with regard to FIGS. 2-9.

Figure 2:
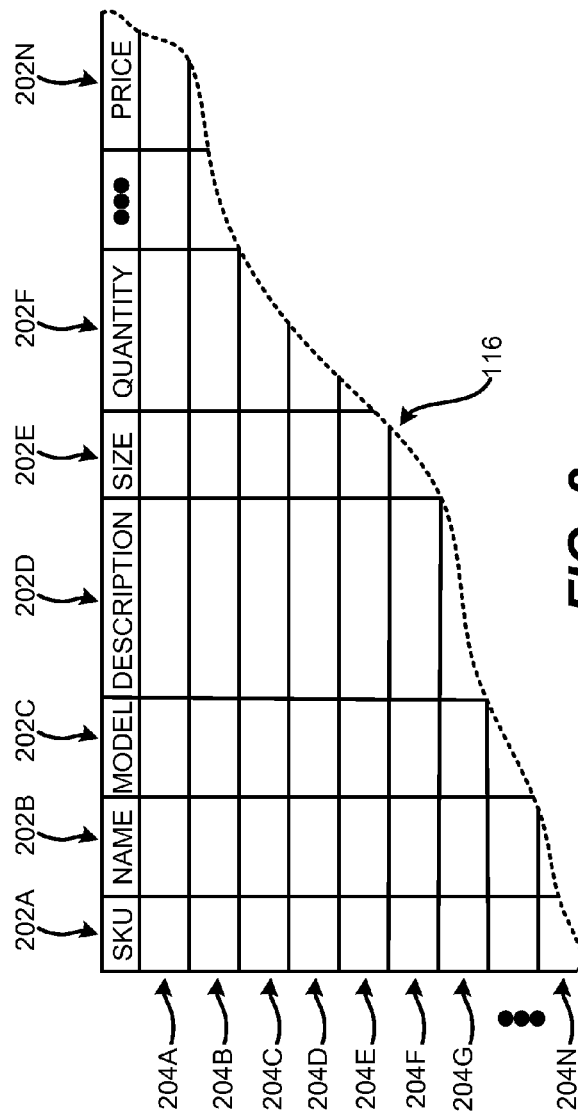
FIG. 2 is a data structure diagram showing aspects of one illustrative data structure utilized to implement a seller feed in embodiments disclosed herein.

FIG. 2 is a data structure diagram showing aspects of one illustrative data structure utilized to implement a seller feed 116 in one embodiment disclosed herein. As mentioned briefly above, the seller feed 116 contains product records storing product information for the products that a marketplace seller 102 offers for sale through the e-commerce marketplace 118. As also mentioned briefly above, the seller feed 116 may be a flat file containing tabular data, an XML file, or any other data container in which product information can be encapsulated. The seller feed 116 may contain product records for multiple products, each product record containing a number of fields, or attributes, identifying the product and describing various aspects of the product.

The illustrative seller feed 116 shown in FIG. 2 is a flat file that includes a number of columns 202A-202N and a number of rows 204A-204N. Each of the rows 204A-204N of the seller feed 116 corresponds to a product record for a product offered for sale by a marketplace seller 102. The values in each row of the seller feed 116 may be referred to herein as a "product record."

Each of the columns 202A-202N of the seller feed 116 corresponds to an attribute of a product in a product record. For example, the column 202A corresponds to a stock-keeping unit ("SKU") number of a product. In one embodiment, the SKU is utilized as a key that allows the client devices 104 and the marketplace operator system 108 to uniquely identify the product records in the seller feed 116. It should be appreciated, however, that other types of identifiers might also be utilized.

In the embodiment shown in FIG. 2, the column 202B of the seller feed 116 corresponds to the name of a product, the column 202C corresponds to a product model, the column 202D corresponds to a text description for a product, and the column 202E corresponds to a size of a product. In the example seller feed 116 shown in FIG. 2, the column 202F corresponds to an available quantity of a product and the column 202N corresponds to the price of a product. It should be appreciated that the columns 202A-202N are merely illustrative and that a seller feed 116 might have different columns than shown in FIG. 2, and might have more or fewer columns 202 than shown in FIG. 2.

At the intersection of each row 204A-204B and column 202A, the seller feed 116 contains a value for the corresponding product and product attribute. For example, the seller feed 116 may include a value at the intersection of row 204A and column 202A specifying the SKU for the first product in the seller feed 116. Similarly, the seller feed 116 may include a value at the intersection of row 204A and column 202B specifying a name of the first product in the seller feed. Other attributes for other products in the seller feed 116 may be specified similarly. Additionally, null values may be specified in the seller feed 116 for various attributes. For example, null values may be specified for attributes that are not applicable to a particular product.

As mentioned above, a seller 102 may utilize an inventory management program or another type of program to generate the seller feed 116. As will be described in greater detail below, the inventory loader application 124 is utilized to process the seller feed 116, and to upload the seller feed 116 to the listing processing module 130. Details regarding these processes will be provided below with regard to FIGS. 3-9.

Figure 3:
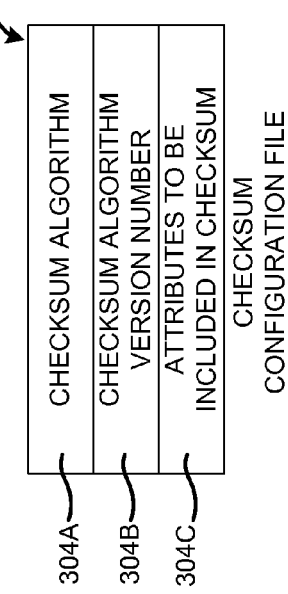
FIG. 3 is a data structure diagram showing aspects of one illustrative data structure utilized to implement a checksum configuration file in embodiments disclosed herein.

FIG. 3 is a data structure diagram showing aspects of one illustrative data structure utilized to implement a checksum configuration file 302 in embodiments disclosed herein. In one embodiment, the listing processing module 130 provides the checksum configuration file 302 to the inventory loader application 124. The checksum configuration file 302 provides instructions to the inventory loader application 124 regarding how the checksums for the product records in the seller feed 116 are to be computed by the client device 104A. The inventory loader application 124 might periodically retrieve an updated checksum configuration file 302 from the marketplace operator system 108 in response to receiving an error message from the listing processing module 130, or in response to the occurrence of other events.

In the implementation illustrated in FIG. 3, the checksum configuration file 302 includes three fields 304A-304C. The field 304A is utilized to store data specifying the checksum algorithm that should be utilized to generate checksums for the attributes in the seller feed 116. The field 304B is utilized to specify a version number of the checksum algorithm specified in the field 304A that should be utilized to generate the checksums for the attributes in the seller feed 116. It should be appreciated that version of any suitable checksum algorithm known to those skilled in the art may be utilized to generate the checksums described herein. For example, cyclic redundancy checks ("CRC"), Adler-32, or Fletcher's checksum may be utilized.

In the implementation shown in FIG. 3, the field 304C is utilized to specify the attributes of the seller feed 116 that should be included in the checksum for each product record. In one embodiment, the field 304C specifies a subset of all of the attributes in a product record. For example, the field 304C might specify a number of attributes of a product record that are not likely to change, or that change very slowly. For instance, the name, model, description, and size of a product might be included in the checksum. Other attributes that are likely to change, like the in stock quantity and price, may not be included in the checksum.

It should be appreciated that the structure of the checksum configuration file 302 shown in FIG. 3 is merely illustrative. Other data structures might be utilized to provide the checksum algorithm, checksum algorithm version number, and attributes to be included in the checksum to the inventory loader application 124. It should also be appreciated that the marketplace operator system 108 might be configured in various ways to provide the checksum configuration file 302 to the inventory loader application 124. For instance, the marketplace operator system 108 might expose a Web service call through which the inventory loader application 124 can obtain the checksum configuration file 302. Other mechanisms might also be utilized. Additional details regarding the use of the checksum configuration file 302 will be provided below with regard to FIGS. 4A-9.

Figure 4A:
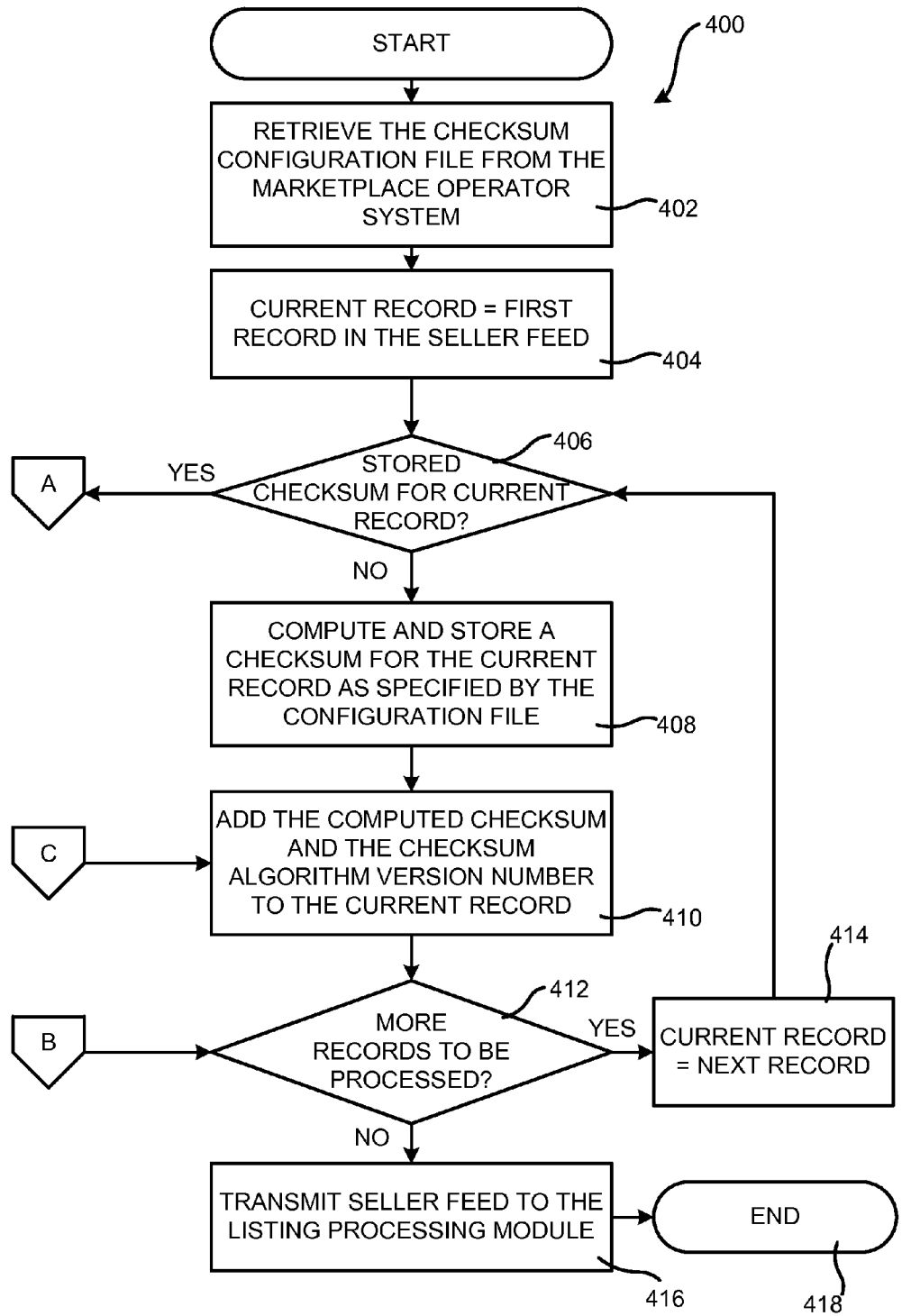
FIGS. 4A-4B are flow diagrams showing aspects of one process disclosed herein for client-based computation of checksums for product information, according to one embodiment disclosed herein.
Figure 4B:
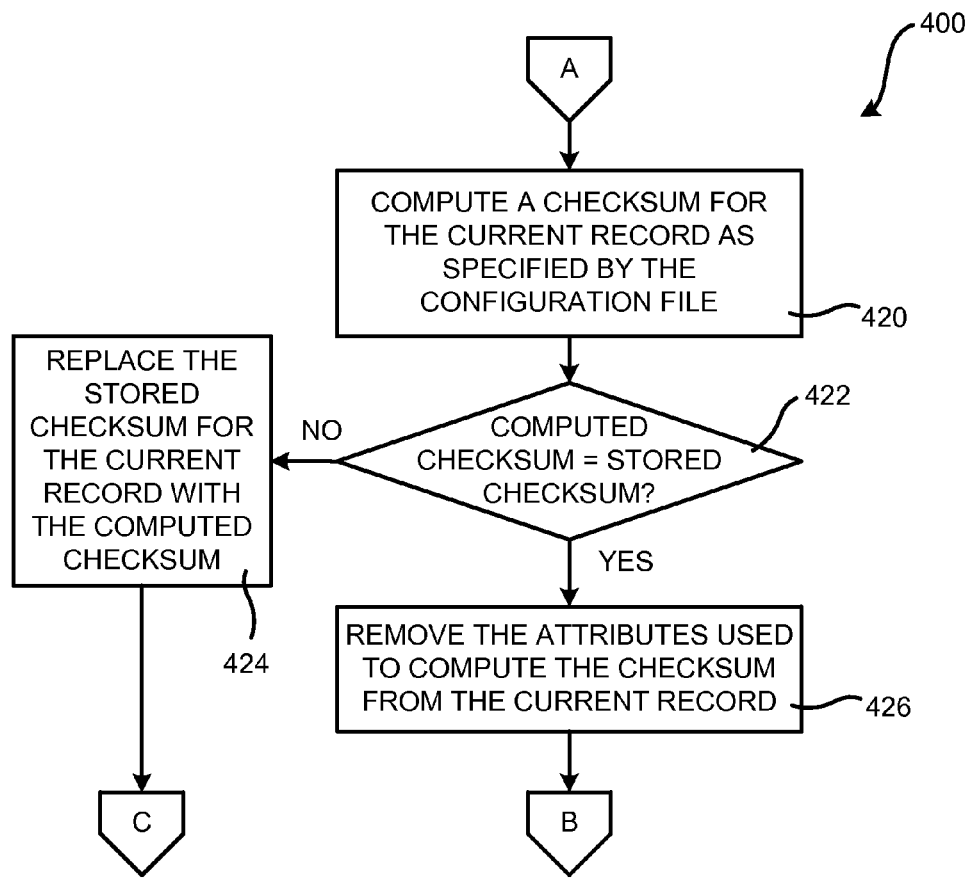

Turning now to FIGS. 4A-4B, additional details will be provided regarding the embodiments described herein for client-side computation of checksums for product information. It should be appreciated that the logical operations described herein with regard to FIGS. 4A-4B, and the other FIGURES, are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 4A-4B are flow diagrams showing aspects of a routine 400 that illustrates aspects of the operation of the inventory loader application 124 for computing checksums for product records in the seller feed 116, according to one embodiment disclosed herein. The routine 400 begins at operation 402, where the inventory loader application 124 retrieves the checksum configuration file 302 from the marketplace operator system 108. As discussed above, the marketplace operator system 108 might expose a Web service through which the inventory loader application 124 can obtain the checksum configuration file 302. Other mechanisms might also be utilized through which the inventory loader application 124 might obtain the most up to date checksum configuration file 302, including periodic polling mechanisms, push mechanisms, and others.

Once the inventory loader application 124 has obtained the checksum configuration file 302, the routine 400 proceeds from operation 402 to operation 404. At operation 404, the inventory loader application 124 initializes a variable to keep track of the current product record in the seller feed 116 that is being processed. The variable is initialized to the first product record (i.e. the first row) in the seller feed 116.

From operation 404, the routine 400 proceeds to operation 406, where the inventory loader application 124 determines whether a checksum has been previously generated and stored for the current product record. If a checksum has not been previously generated for the current product record, the routine 400 proceeds from operation 406 to operation 408. At operation 408, the inventory loader application 124 computes a checksum for the current record utilizing the version of the checksum algorithm specified in the checksum configuration file 302. Only the attributes of the product record specified in the field 304C of the checksum configuration file are included in the checksum. The inventory loader application 124 also stores the generated checksum for future use.

From operation 408, the routine 400 proceeds to operation 410, where the inventory loader application 124 adds the checksum computed at operation 408 to the current product record. The inventory loader application 124 also adds data to the current record that specifies the checksum algorithm version number that was utilized to compute the checksum. In this way, a seller feed 116 is generated that includes checksums for the product records contained therein along with the checksum algorithm version number of the checksum algorithm utilized to compute the checksums.

From operation 410, the routine 400 proceeds to operation 412, where the inventory loader application 124 determines whether additional product records remain to be processed in the seller feed 116. If additional records remain to be processed, the routine 400 proceeds from operation 412 to operation 414. At operation 414, the inventory loader application 124 increments the value of the variable utilized to keep track of the current product record in the seller feed 116 that is being processed. The routine 400 then proceeds from operation 414 to operation 406, described above, where the next product record in the seller feed 116 is processed.

If, at operation 412, the inventory loader application 124 determines that no additional product records remain in the seller feed 116 to be processed, the routine 400 proceeds from operation 412 to operation 416. At operation 416, the inventory loader application 124 transmits the seller feed 116 to the listing processing module 130 executing at the marketplace operator system 108. Once the seller feed 116 has been transmitted to the listing processing module 130, the routine 400 proceeds from operation 416 to operation 418, where it ends.

If, at operation 406, described above, the inventory loader application 124 determines that a checksum has been previously computed and stored for the current record, the routine 400 proceeds from operation 406 to operation 420 (shown in FIG. 4B). At operation 420, the inventory loader application 124 computes a checksum for the current product record as specified by the checksum configuration file 302. The routine 400 then proceeds from operation 420 to operation 422, where the inventory loader application 124 compares the newly computed checksum for the current product record to the previously generated checksum for the current product record.

If the newly computed checksum matches the previously generated checksum for the current product record, the routine 400 proceeds from operation 422 to operation 426. At operation 426, the inventory loader application 124 removes the values for the attributes utilized to compute the checksum from the current product record. In this way, values are not included in the seller feed 116 for attributes of the current product record that have not changed since the last time the seller feed 116 was processed. From operation 426, the routine 400 proceeds to operation 412 (shown in FIG. 4A).

If the newly computed checksum does not match the previously generated checksum for the current product record, the routine 400 proceeds from operation 422 to operation 424. At operation 424, the inventory loader application 124 replaces the previously generated checksum for the current product record with the newly computed checksum. In this way, a new checksum is stored for product records that have attributes that have changed since the last time the seller feed 116 was processed. No attributes are removed from product records having attributes that have changed since the last time the seller feed 116 was processed. From operation 424, the routine 400 proceeds to operation 410, where the newly computed checksum and checksum algorithm version number utilized to compute the new checksum are added to the product record.

Figure 5:
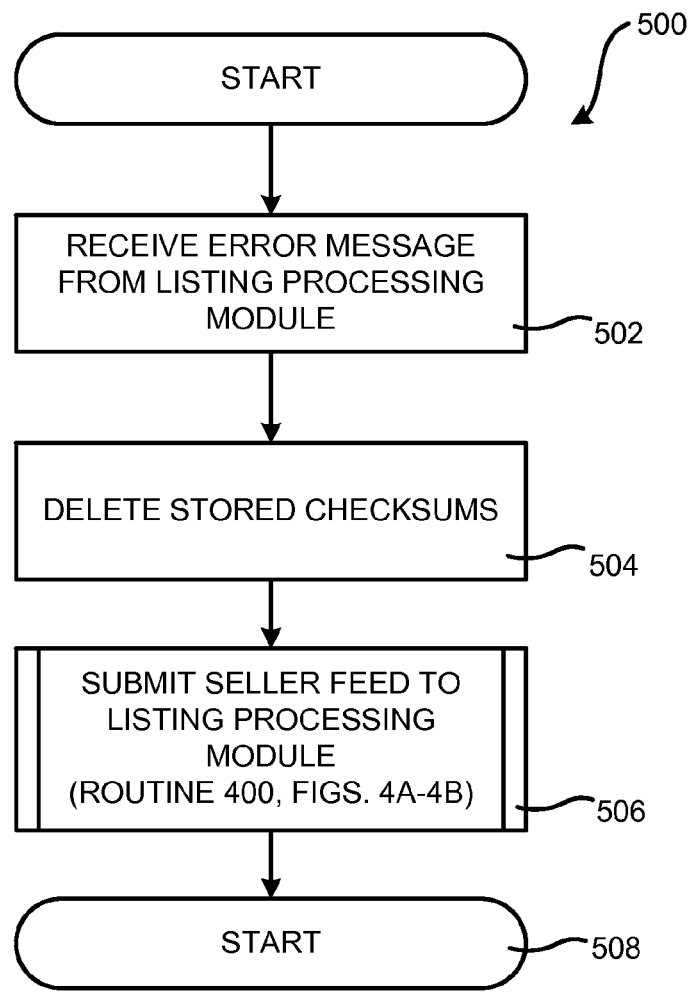
FIG. 5 is a flow diagram showing aspects of one process disclosed herein for processing an error message received from a marketplace operator system following the transmission of a seller feed to the marketplace operator system, according to one embodiment disclosed herein.

FIG. 5 is a flow diagram showing aspects of one routine 500 disclosed herein for processing an error message received from the marketplace operator system 108 following the transmission of a seller feed 116 to the marketplace operator system 108, according to one embodiment disclosed herein. As discussed briefly above, the listing processing module 130 executing on the marketplace operator system 108 might transmit an error message to the inventory loader application 124 instructing the inventory loader application 124 to obtain an updated checksum configuration file 302 and to re-compute the checksums for the product records in the seller feed 116. This may occur, for instance, if the listing processing module 130 determines that the checksum for a product record is invalid or that a down level version of the checksum algorithm has been utilized. The routine 500 illustrates the processing performed by the inventory loader application 124 in one embodiment in response to receiving such an error message.

The routine 500 begins at operation 502, where the inventory loader application 124 receives an error message from the listing processing module 130. In response to receiving the error message, routine 500 proceeds from operation 502 to operation 504, where the inventory loader application 124 deletes the previously generated checksum for each product record. In this way, the inventory loader application 124 invalidates the previously generated checksums for the product records in the seller feed 116. It should be appreciated that the previously generated checksums need not be separately deleted en masse. Rather, the previously generated checksums may be simply overwritten at operation 506, described below, thereby effectively deleting the checksum values.

From operation 504, the routine 500 proceeds to operation 506, where the inventory loader application 124 re-submits the seller feed 116 to the listing processing module 130 as set forth above with regard to FIGS. 4A-4B. In particular, the inventory loader application 124 retrieves an updated checksum configuration file 302 from the marketplace operator system 108, computes a new checksum for each record in the seller feed 116 as specified by the updated checksum configuration file 302, adds the updated checksum to each product record along with the version number of the checksum algorithm utilized to generate the new checksum, and re-transmits the seller feed 116, including the updated product records, to the marketplace operator system 108. The routine 500 then proceeds from operation 506 to operation 508, where it ends.

Figure 6C:
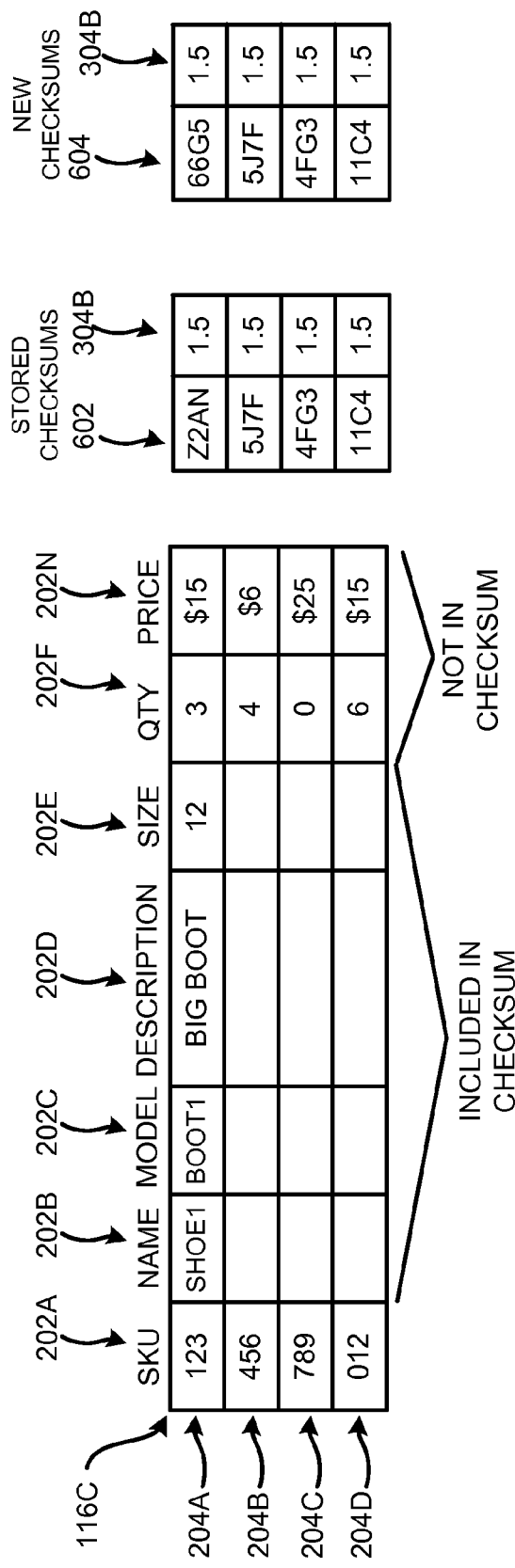

FIGS. 6A-6C are data structure diagrams showing several illustrative seller feeds 116A-116C, respectively, and associated checksums 602 during various stages of processing, according to embodiments disclosed herein. In particular, FIG. 6A shows a fully populated seller feed 116A just prior to submission to the listing processing module 130. In this example, the attributes of the product records referenced by the columns 202B-202E are included in the checksum calculation, while the attributes referenced by the columns 202F and 202N are not included in the checksum calculation.

In the example shown in FIG. 6A, the seller feed 116A has not been previously submitted to the listing processing module 130. As a result, there are no stored checksums 602 or stored checksum version numbers 304B associated with the records of the seller feed 116A. New checksums 604 have been computed for each of the product records in the seller feed 116A and added to the product records. Additionally, a checksum algorithm version number 304B has also been added to each of the product records. The seller feed 116A shown in FIG. 6A is ready for submission to the listing processing module 130.

The example seller feed 116B shown in FIG. 6B is the seller feed 116A, just prior to a subsequent submission to the listing processing module 130. In this example, the attributes of the product records referenced by the columns 202B-202E of the seller feed 116B have not changed since the previous submission of the seller feed 116A to the listing processing module 130. As a result, the previously generated and stored checksums 602 and checksum version numbers 304B match the newly computed checksums 604 for the seller feed 116B and the new checksum version numbers. Consequently, the attributes for the product records in columns 202B-202E have been removed from the seller feed 116B. In this way, the size of the seller feed 116B can be significantly reduced prior to transmission to the listing processing module 130. Note that although some of the data stored in the columns 202F and 202N has not changed in this example, the data stored in these columns is submitted to the listing processing module 130 since the columns 202F and 202N are not utilized when creating the checksums for the product records in the seller feed 116B.

In the example shown in FIG. 6C, an example seller feed 116C is presented that represents the seller feed 116B just prior to another submission to the listing processing module 130. In this example, the attributes of the product record referenced by the row 204A that are utilized to create the checksum have changed since the last submission of the seller feed 116B to the listing processing module 130. As a result, the new checksum 604 for the row 204A (66G5) does not match the previously computed checksum 602 for the row 204A (Z2AN). As a result, the values for the attributes referenced by the columns 202A-202N for the row 204A have not been removed from the seller feed 116C. The stored checksum 602 for the row 204A will also be replaced by the new checksum 604.

It should be appreciated that the seller feeds 116A-116C discussed above with regard to FIGS. 6A-6C, respectively, have been simplified for discussion purposes. It should also be appreciated that these seller feeds 116A-116C are merely illustrative and that seller feeds may be utilized that have many more columns 202 and rows 204 than those shown in FIGS. 6A-6C. The seller feeds might also be stored in a completely different format than shown in FIG. 6C, such as through the use of XML.

Figure 7:
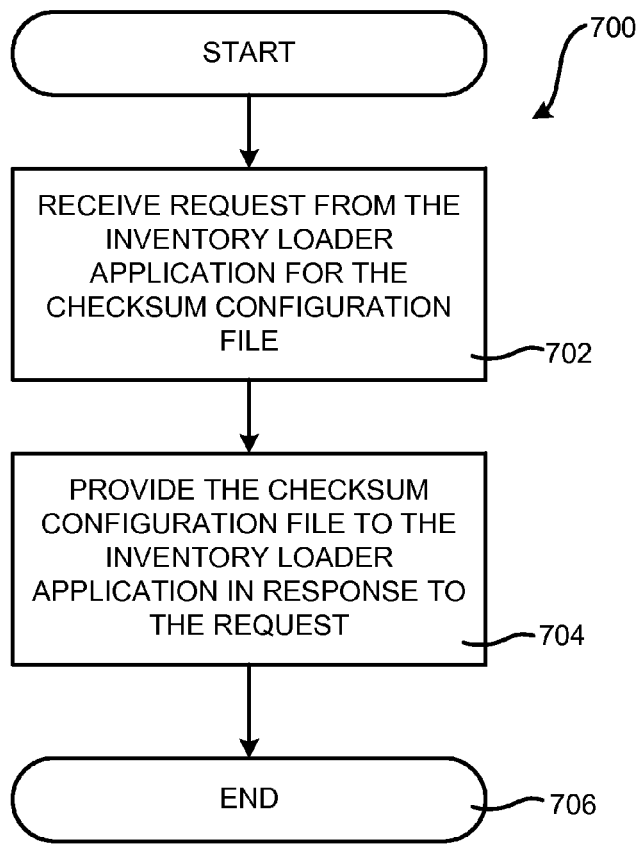
FIG. 7 is a flow diagram showing aspects of one process disclosed herein for providing a checksum configuration file to an inventory loader application, according to one embodiment disclosed herein.

FIG. 7 is a flow diagram showing aspects of one routine 700 disclosed herein for providing a checksum configuration file 302 to an inventory loader application 124, according to one embodiment disclosed herein. As discussed above, the marketplace operator system 108 provides a mechanism for the inventor loader application 124 to retrieve the most current version of the checksum configuration file 302. For example, the marketplace operator system 108 might provide a Web server through which the inventory loader application 124 can obtain the checksum configuration file. The routine 700 illustrates this process.

The routine 700 begins at operation 702, where the marketplace operator system 108 receives a request from the inventory loader application 124. For example, the marketplace operator system 108 might receive a Web service request over HTTP from the inventory loader application 124. In response to receiving the request, the routine 700 proceeds from operation 702 to operation 704.

At operation 704, the marketplace operator system 108 provides the most current version of the checksum configuration file 302 to the inventory loader application 124 in response to the request received at operation 702. The routine 700 then proceeds from operation 704 to operation 706, where it ends. It should be appreciated that the marketplace operator system 108 may be configured to process many simultaneous requests for the checksum configuration file 302 from many instances of the inventory loader application 124 executing on many different client devices 104.

Figure 8A:
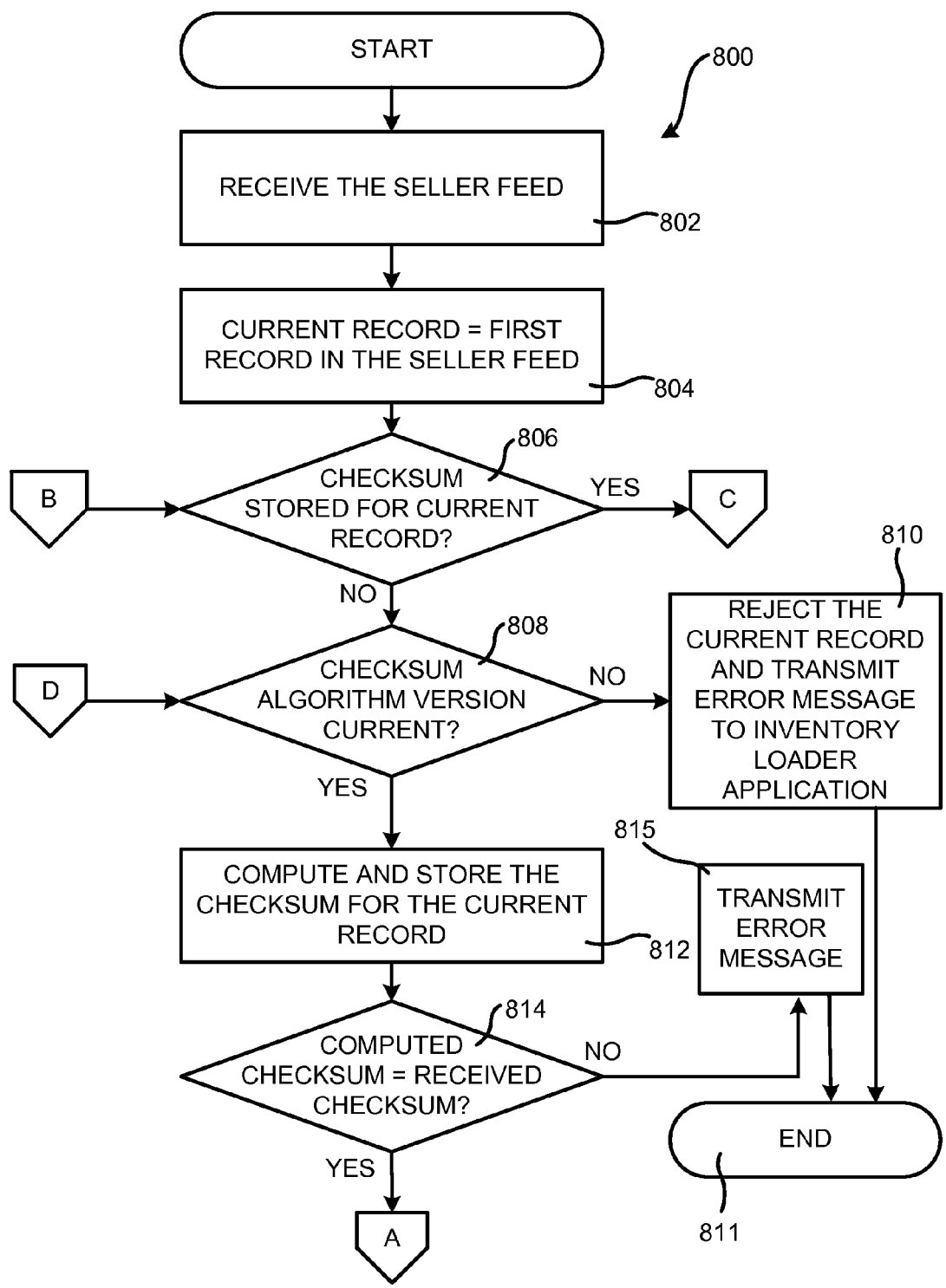
FIGS. 8A-8B are flow diagrams showing aspects of one process disclosed herein for server-side processing of a seller feed that includes checksums generated by a client computer, according to one embodiment disclosed herein.
Figure 8B:
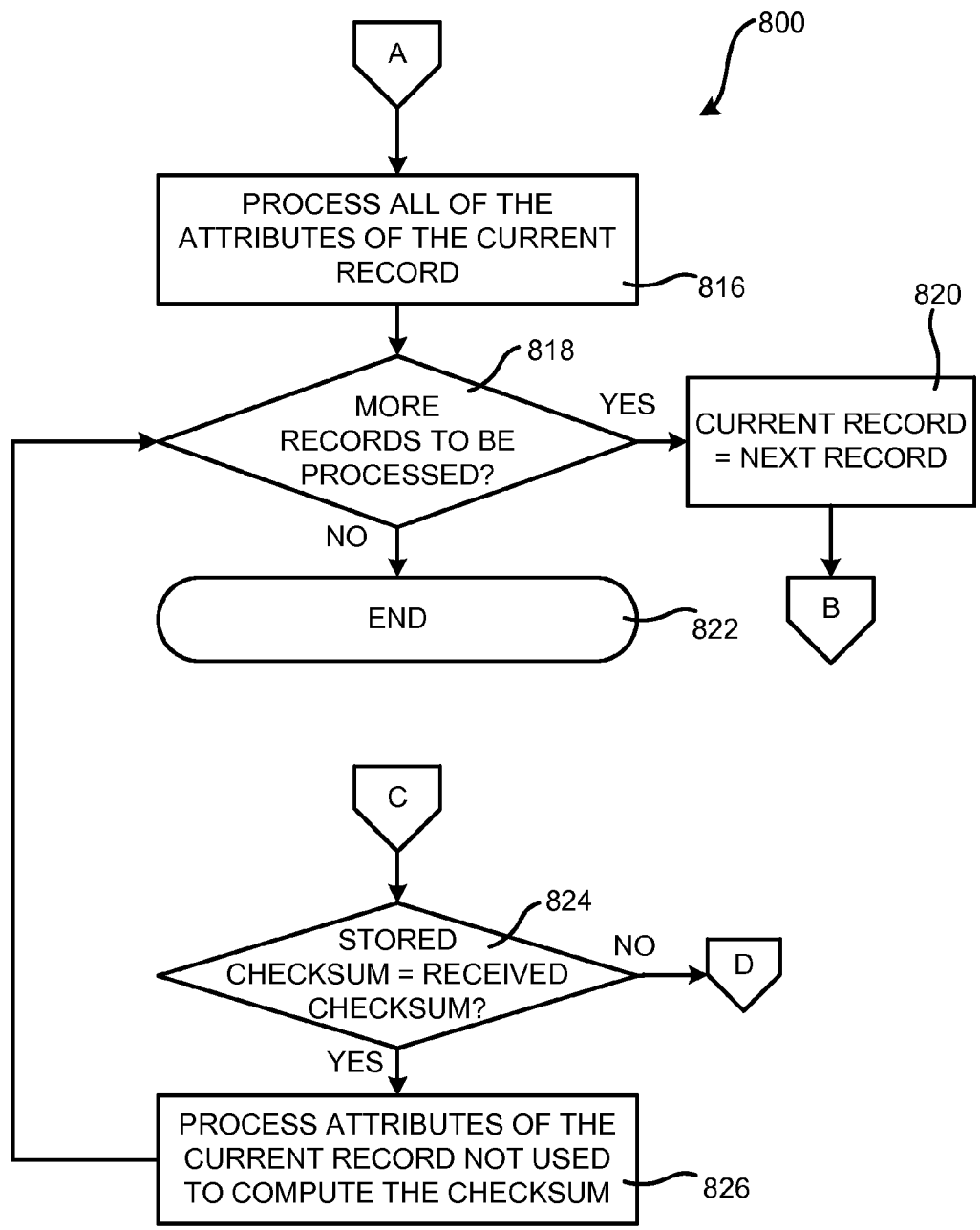

FIGS. 8A-8B are flow diagrams showing aspects of one routine 800 disclosed herein for server-side processing of a seller feed 116 that includes checksums 602 generated by a client device 104A, according to one embodiment disclosed herein. The routine 800 begins at operation 802, where the listing processing module 130 receives the seller feed 116 from the inventory loader application 124. Once the seller feed 116 has been received, the routine 800 proceeds from operation 802 to operation 804.

At operation 804, the listing processing module 130 initializes a variable to keep track of the current record in the seller feed 116 that is being processed. The variable is initialized to the first product record in the seller feed 116. Once the variable has been initialized, the routine 800 proceeds from operation 804 to operation 806.

At operation 806, the listing processing module 130 determines whether a checksum has been previously computed and stored at the marketplace operator system 108 for the current product record in the seller feed 116. If a checksum has not been previously generated and stored for the current product record, the routine 800 proceeds from operation 806 to operation 808, where the listing processing module 130 determines whether the checksum algorithm version number associated with the current product record in the seller feed 116 corresponds to the most current checksum algorithm utilized by the marketplace operator system 108. If the checksum algorithm version number is not the most current, the routine 800 proceeds from operation 808 to operation 810, where the listing processing module 130 transmits an error message to the inventory loader application 124 instructing the inventory loader application 124 to obtain an updated checksum configuration file 302 and to re-compute the checksum for each product record in the seller feed 116. Details regarding this process were provided above. From operation 810, the routine 800 proceeds to operation 811, where it ends.

In another embodiment, the listing processing module 130 may accept the seller feed 116 even if the checksum algorithm version number associated with the current product record in the seller feed 116 does not correspond to the most current checksum algorithm utilized by the marketplace operator system 108. In this implementation, the listing processing module 130 may provide an error message to the inventory loader application 124 indicating that the seller feed 116 has been accepted but that the inventory loader application 124 should retrieve an updated checksum configuration file 302.

If, at operation 808, the listing processing module 130 determines that the checksum algorithm version number received with the current product record corresponds to the most current checksum algorithm, the routine 800 proceeds from operation 808 to operation 812, where the listing processing module 130 computes and stores a checksum for the current product record. The listing processing module 130 also utilizes the data stored in the checksum configuration file 302 to compute the checksum. The routine 800 then proceeds from operation 812 to operation 814, where the listing processing module 130 compares the newly computed checksum for the current product record to the checksum received with the current product record in the seller feed 116.

If the newly computed checksum does not match the received checksum for the current product record, then the routine 800 proceeds from operation 814 to operation 815, where the listing processing module 130 transmits an error message to the inventory loader application 124. If the newly computed checksum does not match the received checksum for the current product record, the listing processing module 130 may be unable to determine why the error occurred. Accordingly, in this instance, the listing processing module 130 may transmit a generic error message to the inventory loader application 124.

If, at operation 814, the listing processing module 130 determines that the newly computed checksum matches the received checksum for the current product record, the listing processing module 130 processes all of the attributes of the current product record. For instance, all of the attributes of the product record may be utilized to update a product listing for the product in the product catalog 122 maintained by the marketplace operator system 108. This occurs at operation 816.

From operation 816, the routine 800 proceeds to operation 818, where the listing processing module 130 determines whether more records remain to be processed in the seller feed 116. If more product records remain to be processed, the routine 800 proceeds from operation 818 to operation 820, where the variable utilized to store the current product record in the seller feed 116 that is being processed is incremented to the next product record in the seller feed 116. The routine 800 then proceeds from operation 820 to operation 806 (shown in FIG. 8A). If no additional records remain to be processed, the routine 800 proceeds from operation 818 to operation 822, where it ends.

If, at operation 806, the listing processing module 130 determines that a checksum has been previously generated and stored for the current product record, the routine 800 proceeds from operation 806 to operation 824 (shown in FIG. 6B). At operation 824, the listing processing module 130 determines whether the checksum received with the current product record matches the checksum previously stored for the current product record. If the listing processing module 130 determines that the checksum received with the current product record does not match the checksum previously stored for the current product record, the routine 800 proceeds from operation 824 (shown in FIG. 8B) to operation 808 (shown in FIG. 8A), which was described above.

If, at operation 824, the listing processing module 130 determines that the checksum received with the current product record matches the checksum previously stored for the current product record, the routine 800 proceeds from operation 824 to operation 826, where the listing processing module 130 processes only those attributes of the current product record that are not utilized to compute the checksum. For instance, the values for the attributes of the current product record not utilized to compute the checksum may be used to update a product listing for the corresponding product in the product catalog 122 maintained by the marketplace operator system 108. In this manner, the listing processing module 130 does not expend computational resources processing data in a seller feed 116 that has not changed since the previous receipt of the seller feed 116.

Figure 9:
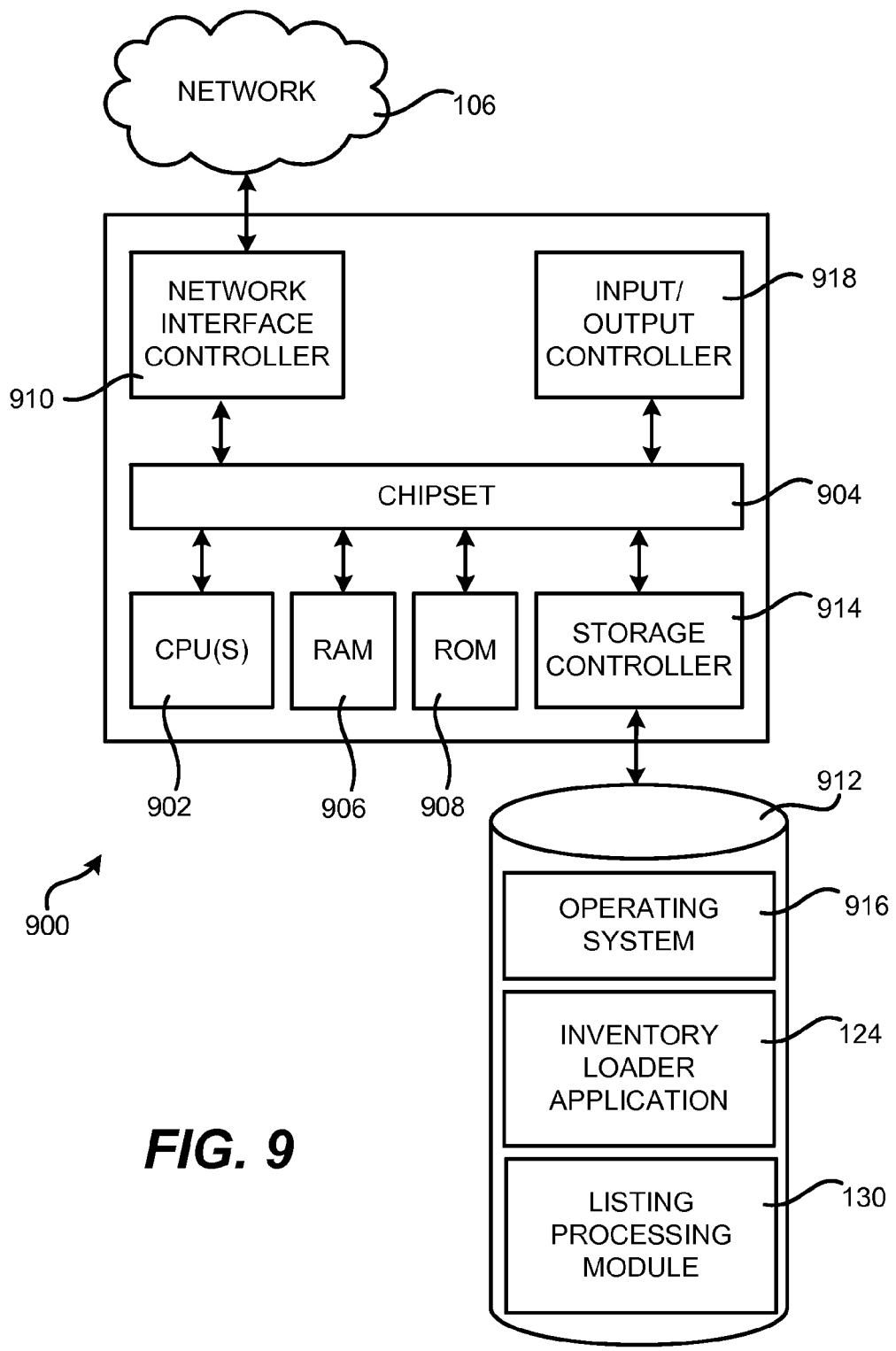
FIG. 9 is a computer architecture diagram showing one illustrative computer hardware architecture for use in computing devices configured to implement the concepts and technologies disclosed herein in one embodiment.

FIG. 9 shows an example computer architecture for a computer 900 capable of executing the software components described herein for generation of checksums for product records by a client device. The computer architecture 900 shown in FIG. 9 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the marketplace operator system 108, the client devices 104A-104B, or on other computing platforms.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 904. The CPUs 902 are standard programmable processors that perform arithmetic and logical operations necessary for the operation of the computer 900.

The CPUs 902 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that help to startup the computer 900 and to transfer information between the various components and devices. The ROM 908 or NVRAM may also store other software components necessary for the operation of the computer 900 in accordance with the embodiments described herein.

According to various embodiments, the computer 900 may operate in a networked environment using logical connections to remote computing devices and computer systems through a network, such as a local-area network ("LAN"), a wide-area network ("WAN"), the Internet, or any other networking topology known in the art that connects the computer 900 to remote computers. The chipset 904 includes functionality for providing network connectivity through a network interface controller ("NIC") 910, such as a gigabit Ethernet adapter.

For example, the NIC 910 may be capable of connecting the computer 900 to other computing devices, such as the application servers 110, the client devices 104A-104B, a data storage system in the marketplace operator system 108, and the like, over the network 106 described above in regard to FIG. 1. It should be appreciated that multiple NICs 910 may be present in the computer 900, connecting the computer to other types of networks and remote computer systems.

The computer 900 may be connected to a mass storage device 912 that provides non-volatile storage for the computer. The mass storage device 912 may store system programs, application programs, other program modules, and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage, or the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 might have access to other computer-readable media to store and retrieve information, such as program modules, data structures, or other data. It should be appreciated by those skilled in the art that computer-readable media can be any available media that may be accessed by the computer 900, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 912 may store an operating system 916 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 912 may store other system or application programs and data utilized by the computer 900. For instance, when utilized to implement the client device 104B, the mass storage device may store the client application 120. When utilized to implement the client device 104A, the mass storage device may store the inventory loader application 124. When utilized to implement one or more of the application servers 110, the mass storage device may store the online shopping module 112 and/or the listing processing module 130.

In one embodiment, the mass storage device 912 or other computer-readable storage media may be encoded with computer-executable instructions that, when loaded into the computer 900, transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 has access to computer-readable storage media storing computer-executable instructions that, when executed by the computer, perform the various routines and operations described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 may provide output to a display device, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for generation of checksums for product information by a client device have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for computation of checksums for product information by a client device, the computer-implemented method comprising executing instructions in a computer system to perform the operations of:
   retrieving a checksum configuration file from a marketplace operator system by way of a client device, the checksum configuration file comprising data specifying a checksum algorithm, a checksum algorithm version number, and one or more attributes of product records for which a checksum should be generated by the client device prior to submission of the product records to the marketplace operator system;
   determining at the client device whether a checksum has been previously generated for a product record;
   in response to determining that a checksum has not been previously generated for the product record, utilizing a version of the checksum algorithm specified by the checksum algorithm version number to compute a checksum for the attributes of the product record specified by the checksum configuration file, and adding the computed checksum and data specifying the checksum algorithm version number to the product record;
   in response to determining that a checksum has been previously generated for the product record, utilizing the version of the checksum algorithm specified by the checksum algorithm version number to compute a checksum for the attributes of the product record specified by the checksum configuration file, comparing the computed checksum to the previously generated checksum for the product record, and removing values for the attributes of the product record specified by the checksum configuration file from the product record if the computed checksum is the same as the previously generated checksum; and
   transmitting the product record from the client device to the marketplace operator system.

2. The computer-implemented method of claim 1, further comprising in response to determining that the computed checksum is not the same as the previously generated checksum:
   replacing the previously generated checksum with the computed checksum at the client device; and
   adding the computed checksum and data specifying the checksum algorithm version number to the product record.

3. The computer-implemented method of claim 2, further comprising in response to receiving an error message from the marketplace operator system at the client device:
   deleting the previously generated checksum for the product record;
   retrieving an updated checksum configuration file from the marketplace operator system;
   utilizing a version of the checksum algorithm specified by the updated checksum configuration file to compute an updated checksum for attributes of the product record specified by the updated checksum configuration file;
   adding the updated checksum and data specifying the checksum algorithm version number utilized to compute the updated checksum to the product record; and
   transmitting the product record from the client device to the marketplace operator system.

4. The computer-implemented method of claim 3, wherein the attributes of the product records for which a checksum should be generated by the client device specified by the checksum configuration file comprise a subset of all of the attributes of the product records.

5. A computer-readable storage medium having computer-executable instructions stored thereupon which, when executed by a computer, cause the computer to:
   provide a checksum configuration file from a marketplace operator system to a client device, the checksum configuration file comprising data specifying a checksum algorithm, a checksum algorithm version number, and one or more attributes of product records for which a checksum should be generated by the client device prior to submission of the product records to the marketplace operator system;
   receive a product record from the client device;
   determine whether a checksum has been previously stored for the product record; and
   in response to determining that a checksum has not been previously stored for the product record, determine whether a checksum algorithm version number received with the product record matches a current checksum algorithm version number, and to transmit an error message to the client device instructing the client device to obtain an updated checksum configuration file and to re-compute the checksum for the product record if the checksum algorithm version number received with the product record does not match the current checksum algorithm version number.

6. The computer-readable storage medium of claim 5, wherein the error message further indicates to the client device that the product record has been processed even though the checksum algorithm version number received with the product record does not match a current checksum algorithm version number.

7. The computer-readable storage medium of claim 6, having further computer-executable instructions stored thereupon which, when executed by the computer, cause the computer to:
   in response to determining that the checksum algorithm version number received with the product record matches the current checksum algorithm version number, compute and store a checksum for one or more attributes of the product record, compare the computed checksum to a checksum received with the product record, and to transmit an error message to the client device if the computed checksum does not match the checksum received with the product record.

8. The computer-readable storage medium of claim 7, having further computer-executable instructions stored thereupon which, when executed by the computer, cause the computer to:
   process all of the attributes of the product record in response to determining that the computed checksum matches the checksum received with the product record.

9. The computer-readable storage medium of claim 8, having further computer-executable instructions stored thereupon which, when executed by the computer, cause the computer to:
   in response to determining that a checksum has been previously stored for the product record, determine whether the checksum received with the product record matches the checksum previously stored for the record, and process one or more attributes of the product record not utilized to compute the checksum in response to determining that the received checksum matches the stored checksum.

10. The computer-readable storage medium of claim 9, wherein the product record comprises one record in a seller feed received at the marketplace operator system and comprising a plurality of product records.

11. The computer-readable storage medium of claim 10, wherein the attributes of the product record for which a checksum should be generated by the client device specified by the checksum configuration file comprise a subset of all of the attributes of the plurality of product records in the seller feed.

12. An apparatus for computation of checksums for product records by a client device, the apparatus comprising:
at least one processor; and
a computer-readable storage medium having computer-executable instructions stored thereon which, when executed on the at least one processor, cause the apparatus to
determine whether a checksum has been previously generated for a product record,
in response to determining that a checksum has been previously generated for the product record, to compute a checksum for the product record and to compare the computed checksum to the previously generated checksum,
to remove one or more attributes utilized to compute the checksum from the product record if the computed checksum is the same as the previously generated checksum,
in response to determining that the computed checksum is not the same as the previously generated checksum, to replace the previously generated checksum with the computed checksum, and
to transmit the product record from the apparatus to a marketplace operator system.

13. The apparatus of claim 12, wherein the computer-readable storage medium has further computer-executable instructions stored thereon which, when executed on the at least one processor, cause the apparatus to:
retrieve a checksum configuration file from the marketplace operator system, and to
compute the checksum for the product record in accordance with data contained in the checksum configuration file.

14. The apparatus of claim 13, wherein the data contained in the checksum configuration file specifies a checksum algorithm for use in computing the checksum for the product record.

15. The apparatus of claim 14, wherein the data contained in the checksum configuration file further specifies a version number of the checksum algorithm for use in computing the checksum for the product record.

16. The apparatus of claim 15, wherein the data contained in the checksum configuration file further specifies one or more attributes of the product record that are to be included in the checksum.

17. The apparatus of claim 16, wherein the computer-readable storage medium has further computer-executable instructions stored thereon which, when executed on the at least one processor, cause the apparatus to:
in response to determining that a checksum has not been previously generated for the product record, to utilize a version of the checksum algorithm specified by the checksum algorithm version number to compute a checksum for the attributes of the product record specified by the checksum configuration file, and to add the computed checksum and data specifying the checksum algorithm version number to the product record.

18. The apparatus of claim 17, wherein the computer-readable storage medium has further computer-executable instructions stored thereon which, when executed on the at least one processor, cause the apparatus to:
receive an error message from the marketplace operator system; and
in response to receiving the error message, to delete the previously generated checksum for the product record, to retrieve an updated checksum configuration file from the marketplace operator system, to utilize a version of the checksum algorithm specified by the updated checksum configuration file to compute an updated checksum for attributes of the product record specified by the updated checksum configuration file, and to add the updated checksum and data specifying the checksum algorithm version number utilized to compute the updated checksum to the product record.

19. The apparatus of claim 18, wherein the product record comprises one record in a seller feed received at the marketplace operator system and comprising a plurality of product records.

20. The apparatus of claim 19, wherein the attributes of the product record for which a checksum should be generated by the client device specified by the checksum configuration file comprise a subset of all of the attributes of the plurality of product records in the seller feed.

* * * * *